US012581237B2

(12) United States Patent
Welti

(10) Patent No.: US 12,581,237 B2
(45) Date of Patent: Mar. 17, 2026

(54) TECHNIQUES FOR USING ELASTIC SHEETS TO IMPROVE LISTENING EXPERIENCES ASSOCIATED WITH HEADPHONES

(71) Applicant: HARMAN INTERNATIONAL INDUSTRIES, INCORPORATED, Stamford, CT (US)

(72) Inventor: Todd S. Welti, Thousand Oaks, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 263 days.

(21) Appl. No.: 18/246,832

(22) PCT Filed: Sep. 27, 2021

(86) PCT No.: PCT/US2021/052232
§ 371 (c)(1),
(2) Date: Mar. 27, 2023

(87) PCT Pub. No.: WO2022/067199
PCT Pub. Date: Mar. 31, 2022

(65) Prior Publication Data

US 2023/0379629 A1 Nov. 23, 2023

Related U.S. Application Data

(60) Provisional application No. 63/084,510, filed on Sep. 28, 2020.

(51) Int. Cl.
*H04R 5/033* (2006.01)
*H04R 1/06* (2006.01)
*H04R 1/10* (2006.01)

(52) U.S. Cl.
CPC ............. *H04R 5/0335* (2013.01); *H04R 1/06* (2013.01); *H04R 1/1008* (2013.01); *H04R 1/1066* (2013.01); *H04R 1/1083* (2013.01)

(58) Field of Classification Search
CPC ...... H04R 5/0335; H04R 1/06; H04R 1/1008; H04R 1/1066; H04R 1/1083;
(Continued)

(56) References Cited

U.S. PATENT DOCUMENTS

D657,345 S * 4/2012 Brunner ................. H04R 5/033 D14/205
8,605,935 B1 * 12/2013 Huang ................... H04R 1/105 381/381

(Continued)

FOREIGN PATENT DOCUMENTS

CN 103997701 A * 8/2014 ............... H04R 1/10
EP 1811806 A2 7/2007
WO WO-2012084032 A1 * 6/2012 ........... H04R 5/0335

*Primary Examiner* — Angelica M McKinney
(74) *Attorney, Agent, or Firm* — Artegis Law Group, LLP

(57) ABSTRACT

A headphone assembly includes a headband that is coupled to an outer ring, an elastic sheet that is coupled to the outer ring, and a headphone cup that is suspended within the outer ring by the elastic sheet. In some embodiments, the elastic sheet is configured to press the headphone cup against at least one of a portion of a head of a user or a pinna of an ear of the user.

17 Claims, 5 Drawing Sheets

(58) Field of Classification Search
CPC .......... H04R 2201/103; H04R 2460/01; H04R 1/105; H04R 1/1033; H04R 2201/107
See application file for complete search history.

(56) References Cited

U.S. PATENT DOCUMENTS

| | | | | |
|---|---|---|---|---|
| 2011/0044463 | A1 | 2/2011 | Dirusso | |
| 2015/0230016 | A1* | 8/2015 | Burgett | H04R 1/1033<br>24/68 R |
| 2016/0219357 | A1* | 7/2016 | Fu | H04R 1/1033 |
| 2016/0277822 | A1* | 9/2016 | Blair | H04R 1/105 |
| 2021/0337295 | A1* | 10/2021 | Lefebvre | H04R 1/1008 |

* cited by examiner

TECHNIQUES FOR USING ELASTIC SHEETS TO IMPROVE LISTENING EXPERIENCES ASSOCIATED WITH HEADPHONES

CROSS-REFERENCES TO RELATED APPLICATIONS

This application is a national stage application of the international application titled "TECHNIQUES FOR USING ELASTIC SHEETS TO IMPROVE LISTENING EXPERIENCES ASSOCIATED WITH HEADPHONES," filed on Sep. 27, 2021 and having application number PCT/US2021/052232, and claims the priority benefit of United States provisional application titled, "TECHNIQUES FOR USING ELASTIC SHEETS TO IMPROVE LISTENING EXPERIENCES ASSOCIATED WITH HEADPHONES," filed on Sep. 28, 2020, and having Ser. No. 63/084,510. The subject matter of these related applications is hereby incorporated herein by reference.

BACKGROUND

Field of the Various Embodiments

The present disclosure is directed to headphones and, more particularly, to techniques for using elastic sheets to improve listening experiences associated with headphones.

Description of the Related Art

Audio devices often include headphones that are positioned on a head of a user and that use an audio output device, such as a speaker, diaphragm, or the like, to generate sound based on an audio signal received from an audio source. In some audio devices, the audio source is integrated (e.g., an integrated audio player that generates the audio signal based on stored audio data). In some other audio devices, the audio source is external to the audio device, and the audio device receives the audio signal via a wired or wireless connection (e.g., a radio including an antenna that receives a wireless radio broadcast from a regional radio broadcasting station). In various audio devices, the headphones are permanently or detachably connected through a wired cable, or connected through a wireless communication channel (e.g., Bluetooth headphones).

Headphones feature many designs, such as in-ear headphones that are inserted into the ear canal (e.g., "earbuds"), supra-aural headphones that rest on the pinna of the ear, and circumaural headphones that rest on the head of the user and surround or enclose the ear. Supra-aural and circumaural headphones are typically designed as a pair of headphone cups connected to a curved headband that fits the top or rear surface of the head of the user. The headband and headphone cups are typically formed of a rigid material, such as polyvinyl chloride (PVC), polyurethane, or the like, in order to hold an audio output device at a fixed position relative to each other and the head of the user, while the headphones are worn by the user. The headphone cups enclose the audio output device and conducting wire that carry a driving audio signal. The headphone cups also typically have a soft or spongy material, such as (for example and without limitation) rubber, vinyl, leather, silicone, or the like, in order to cushion the ear or head of the user from the rigid material of the headphone cups. In some headphones, the headband is expandable to various curved lengths to fit the head sizes of different users. Each headphone cup can include one or more pivot mechanisms that enable the headphone cups to rotate (e.g., a first pivot mechanism that enables the headphone cup to rotate in an upward/downward direction about a front/back axis, and a second pivot mechanism that enables the headphone cup to rotate in a left/right direction about a vertical axis).

However, these designs of supra-aural and circumaural headphones exhibit some disadvantages. First, adjustability of many headphone designs can be too limited to create a seal between the headphones and the ear of the user. For instance, pivot mechanisms enable the headphone cup to rotate along the axes aligned with each pivot mechanism, but not along axes that are not aligned with any of the pivot mechanisms. As a result, the headphone cups could exert contact and press on the pinna of the ears in a forward or backward direction. Each pivot mechanism can bias and/or limit the range of motion of the headphone cups in response to different head shapes and/or ear shapes. As a result, conventional headphone cups can be unable to seal consistently and/or properly to the head and/or ears of the user. When one or both of the conventional headphone cups do not consistently seal to the head and/or the ears of each user, a variable amount of audio signals can leak, leading to differences in the perceived low frequency response of the sound generator by different users and/or based on different placements of the headphones. Further, the incomplete seal reduces the isolation of audio output from ambient noise, which can interfere with the reception of the audio output by the user. This is the most common failure mode for consumer headphones.

Second, adjustability of many headphone designs can create points of mechanical failure. For example, pivot mechanisms, which can concentrate mechanical stresses to a localized area, can be fragile and prone to breakage as a result of repetitive manipulation physical stress. Damage to one or both of the pivot mechanisms causes a loss of adjustability or separation of the speaker from the headphone cup or headband.

Third, the rigid components of many headphone designs can convey vibration. Additionally, the rigid components of many headphone designs can create microphonics, in which parts of the headphones, such as a wire, can rub against other parts of the headphones, or the body or clothing of the user, and these mechanical vibrations and be transmitted inside the earcup and converted to sound vibrations, which can be irritating and distracting.

Fourth, adjustability of many headphone designs can reduce the comfort and/or wearability of the headphones. As previously noted, a headphone cup with one or more pivot mechanisms can rotate along the axes aligned with each pivot mechanism, but not along axes that are not aligned with any of the pivot mechanisms. However, different users have different sizes and/or shapes of heads and ears. Further, a left ear of a user can be asymmetric with respect to a right ear of the user. A mismatch between the orientation of the headphone cup and the orientation of the pinna of the ear or the head can cause the force to be unevenly distributed. As a result, the user could experience discomfort from wearing the headphones, particularly for an extended duration. Similarly, an extendable headband can be adjusted to different curved lengths, but not the radius of curvature, particularly near the headphone cups. As a result, for a first user, the part of the headband near the headphone cups could be too curved, which exerts additional inward pressure against the head of the user that can be uncomfortable. For a second user (such as a child), the part of the headband near the headphone cups could be not curved enough, which reduces inward pressure against the head of the user and causes the headphones to be easily dislodged from the head of the user. Second, discomfort can occur due to contact between the rigid housing of the headphone cups and the head or pinna of the user. As an additional consideration, the rigid material of the headphone cups in many supra-aural and circumaural headphone designs increases the size and/or weight of the headphones. As a result, the headphones can be large and/or heavy, which is undesirable for users who prefer smaller headphones that are more unobtrusive or easier to carry.

As the foregoing illustrates, what is needed are techniques for headphones that provide an improved seal between the headphones and the ears of a user.

SUMMARY

In some embodiments, a headphone assembly includes a headband that is coupled to an outer ring, an elastic sheet that is coupled to the outer ring, and a headphone cup that is suspended within the outer ring by the elastic sheet.

In some embodiments, an audio system includes an audio source, an audio output device configured to generate output based on an audio signal received from the audio source, and a headphone assembly, where the headphone assembly includes a headband that is coupled to an outer ring, an elastic sheet that is coupled to the outer ring, and a headphone cup that is suspended within the outer ring by the elastic sheet.

At least one technical advantage of the disclosed techniques relative to the prior art is that, with the disclosed techniques, an improved seal is created between the headphone cup and the ear of the user. As a result, generated audio is less susceptible to leakage and more insulated from ambient noise, thus improving perceived audio quality. As another advantage, the flexibility of the elastic sheet improves the positioning of the headphone cup relative to the pinna of the ear with reduced inward pressure against the pinna or the head as compared with pivot mechanisms, resulting in improved comfort and wearability. As yet another advantage, the substitution of elastic sheet for pivot mechanisms improves the durability of the headphones by reducing potential points of mechanical failure. As yet another advantage, the use of elastic sheets reduces the volume of rigid material in the headphone cups, resulting in desirably smaller and lighter headphones. These technical advantages provide one or more technological improvements over prior art headphones.

BRIEF DESCRIPTION OF THE DRAWINGS

So that the manner in which the above recited features of the various embodiments can be understood in detail, a more particular description of the inventive concepts, briefly summarized above, can be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, the inventive concepts can be practiced without one or more of these specific details. In the figures, multiple instances of like objects are denoted with reference numbers identifying the object and parenthetical numbers identifying the instance where needed.

Figure 1A:
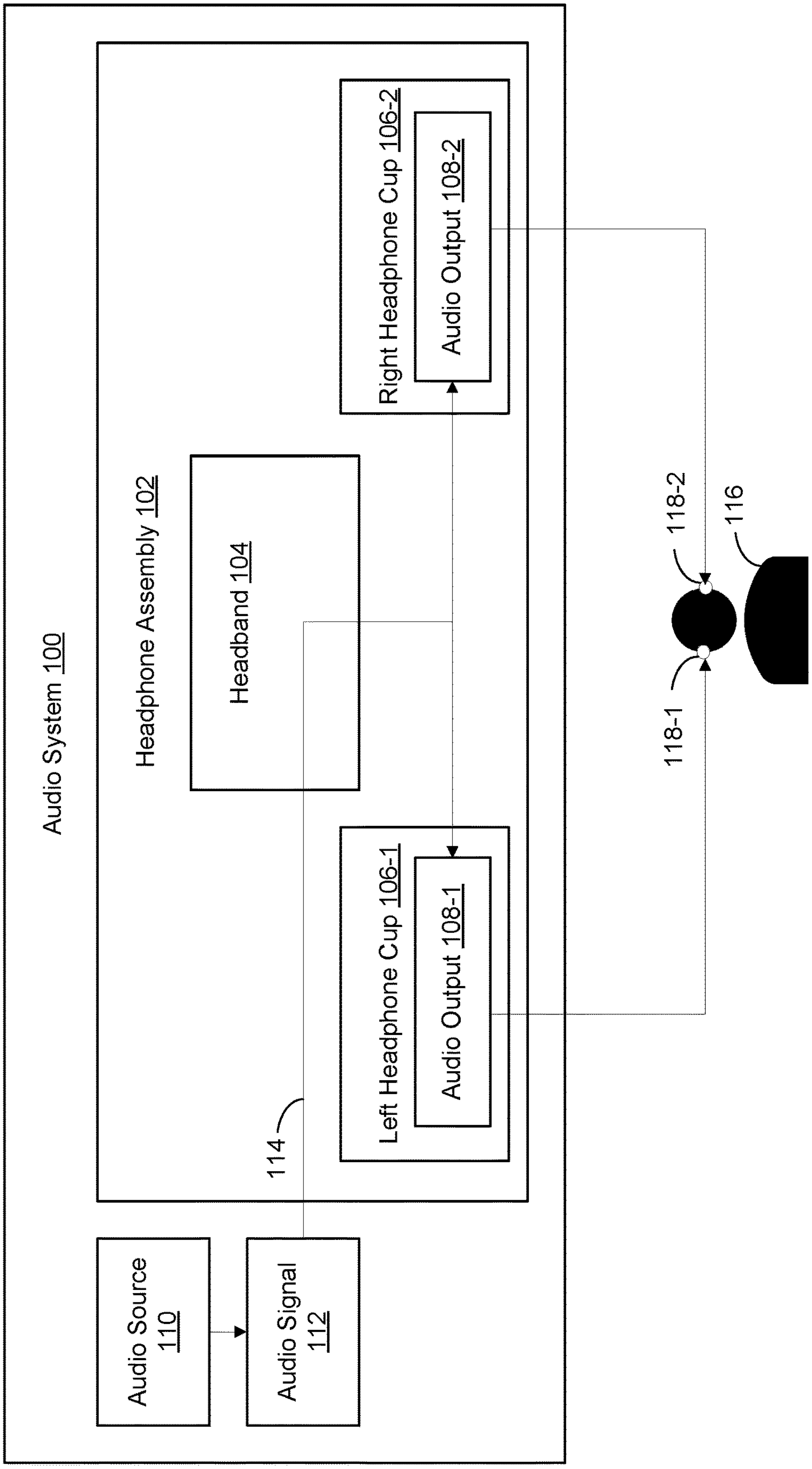
FIGS. 1A-1B illustrate audio systems configured for use with one or more aspects of the various embodiments.

FIG. 1A illustrates an audio system 100 configured for use with one or more aspects of the various embodiments. The audio system 100 includes, without limitation, an audio source 110 and a headphone assembly 102. The audio system 100 can include any type of the headphone assembly 102 in which at least a portion of each side assembly of the headphone assembly 102 is designed to rest on and/or cover a corresponding ear of a user that is wearing the audio system 100.

As shown, the headphone assembly 102 includes, without limitation, a headband 104, a left headphone cup 106-1, and a right headphone cup 106-2. When the headphone assembly 102 is worn by a user 116, the left headphone cup 106-1 is positioned near a left ear 118-1 of the user 116, and the right headphone cup 106-2 is positioned near a right ear 118-2 of the user 116. The left headphone cup 106-1 and the right headphone cup 106-2 are held in place by the headband 104, which, in some embodiments, spans a top or back of the head of the user 116. In some embodiments, the headband 104 is adjustable to a desired length and/or shape. In some embodiments, the headphone assembly 102 is a circumaural headphone, in which each elastic sheet is configured to press one of the headphone cups 106 against a portion of a head of the user 116. In some other embodiments, the headphone assembly 102 is a supraaural headphone, in which each elastic sheet is configured to press one of the headphone cups 106 against a pinna of an ear 118 of a user 116.

The left headphone cup 106-1 includes a left audio output device 108-1, and the right headphone cup 106-2 includes a right audio output device 108-2. In various embodiments, the left audio output device 108-1 and the right audio output device 108-2 include (for example, and without limitation) one or more speakers, diaphragms, piezoelectric transducers, or the like, as well as any number and/or combination thereof. The left audio output device 108-1 and the right audio output device 108-2 can include a same or similar type of audio output device or can include different types of audio output devices. In some embodiments, each headphone cup is approximately 1.5 inches to 2.0 inches in diameter.

As shown, the audio source 110 originates an audio signal 112. The audio signal 112 is based on audio content, such as music, speech, noise, sound effects, or the like. In some embodiments, an active noise cancelling system generates anti-noise that destructively interferes with ambient noise. In some embodiments, the audio content is stored by the audio system 100 (e.g., by a data store configured to store recorded audio). Alternatively or additionally, in some embodiments, and/or generated by the audio system 100 and/or an external device. For example and without limitation, the audio source 110 can be an electronic device that is integrated with the audio system 100, such as an MP3 player, a smart phone, and/or the like. The audio signal 112 can include a mono audio signal that is output by both the left audio output device 108-1 and the right audio output device 108-2. The audio signal 112 can include stereo audio signal the includes a left audio signal that is output by the left audio output device 108-1 and a right audio signal that is output by the right audio output device 108-2. The audio signal 112 can encode audio information in an analog encoding and/or digital encoding.

The audio source 110 transmits one or more audio signals 112 to one or both of the left audio output device 108-1 and the right audio output device 108-2 via a cable 114. In some embodiments, the cable 114 includes a first signal wire that transmits at least a portion of the audio signal 112 to the left audio output device 108-1, a second signal wire that transmits at least a portion of the audio signal 112 to the right audio output device 108-2 (e.g., another wire coupled to another audio output device), and one or more ground wires. In some embodiments, at least a portion of the cable 114 is integrated with the headphone assembly 102, and in particular with the headband 104.

Figure 1B:
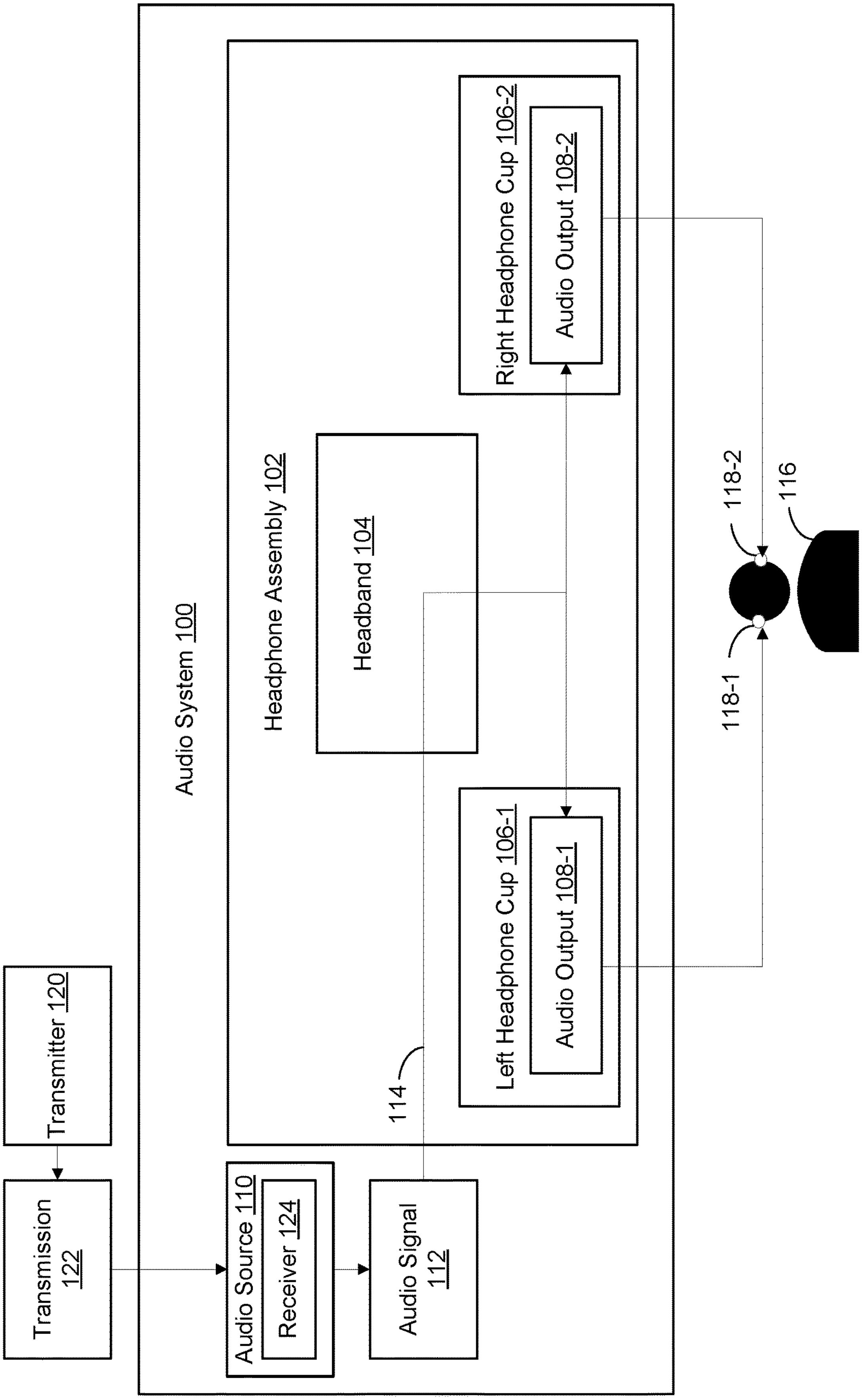

FIG. 1B illustrates another audio system configured for use with one or more aspects of the various embodiments. The audio system 100 includes, without limitation, an audio source 110 and a headphone assembly 102. The audio system 100 can include any type of the headphone assembly 102 in which at least a portion of each side assembly of the headphone assembly 102 is designed to rest on and/or cover a corresponding ear of a user that is wearing the audio system 100. In some embodiments, the headphone assembly 102 is a circumaural headphone, in which each headphone cup 106 is configured to contact a portion of a head of the user 116. In some other embodiments, the headphone assembly 102 is a supraaural headphone, in which each headphone cup 106 is configured to contact a portion of a pinna of an ear 118 of a user 116. Elements of FIG. 1B can be or can include similar features as discussed with regard to the corresponding elements of FIG. 1A.

As shown, the headphone assembly 102 includes, without limitation, a headband 104, a left headphone cup 106-1, and a right headphone cup 106-2. When the headphone assembly 102 is worn by a user 116, the left headphone cup 106-1 is positioned near a left ear 118-1 of the user 116, and the right headphone cup 106-2 is positioned near a right ear 118-2 of the user 116. The left headphone cup 106-1 and the right headphone cup 106-2 are held in place by the headband 104, which, in some embodiments, spans a top or back of the head of the user 116. In some embodiments, the headband 104 is adjustable to a desired length and/or shape.

As shown, the audio source 110 includes a receiver 124 that receives a transmission 122 from a transmitter 120. For example (without limitation), the transmitter 120 can be a radio station that broadcasts a global, regional, or local AM or FM radio signal. The transmitter 120 can be a wireless audio device that transmits a wireless audio signal, such as a Bluetooth audio signal. The transmission 122 can encode audio information in an analog encoding and/or digital encoding. The transmission 122 can include multiple channels, such as a stereo audio transmission. The transmission 122 can include multiple audio streams, such as multiple radio stations. The transmission 122 can include other data, such as video accompanying one or more audio streams, and/or metadata about the audio, such as text indicating song titles or lyrics. The audio source 110 can receive the transmission 122 by the receiver 124 and output an audio signal 112 for the left audio output device 108-1 and the right audio output device 108-2. The audio signal 112 can be the same or similar to the transmission 122, or can be a subset of the transmission 122, such as one radio station selected from multiple radio stations in the transmission 122. The audio signal 112 can encode audio in the same or similar manner as the transmission 122 or can be transcoded to a different encoding format (e.g., the transmission 122 can include an analog encoding, and the audio signal 112 can include a digital encoding). In some embodiments that include active noise cancelling, the transmitter 120 is a microphone and the transmission 122 includes a sampling of ambient noise, and the audio source 110 generates the audio signal 112 that includes anti-noise that destructively interferes with the ambient noise.

Figure 2:
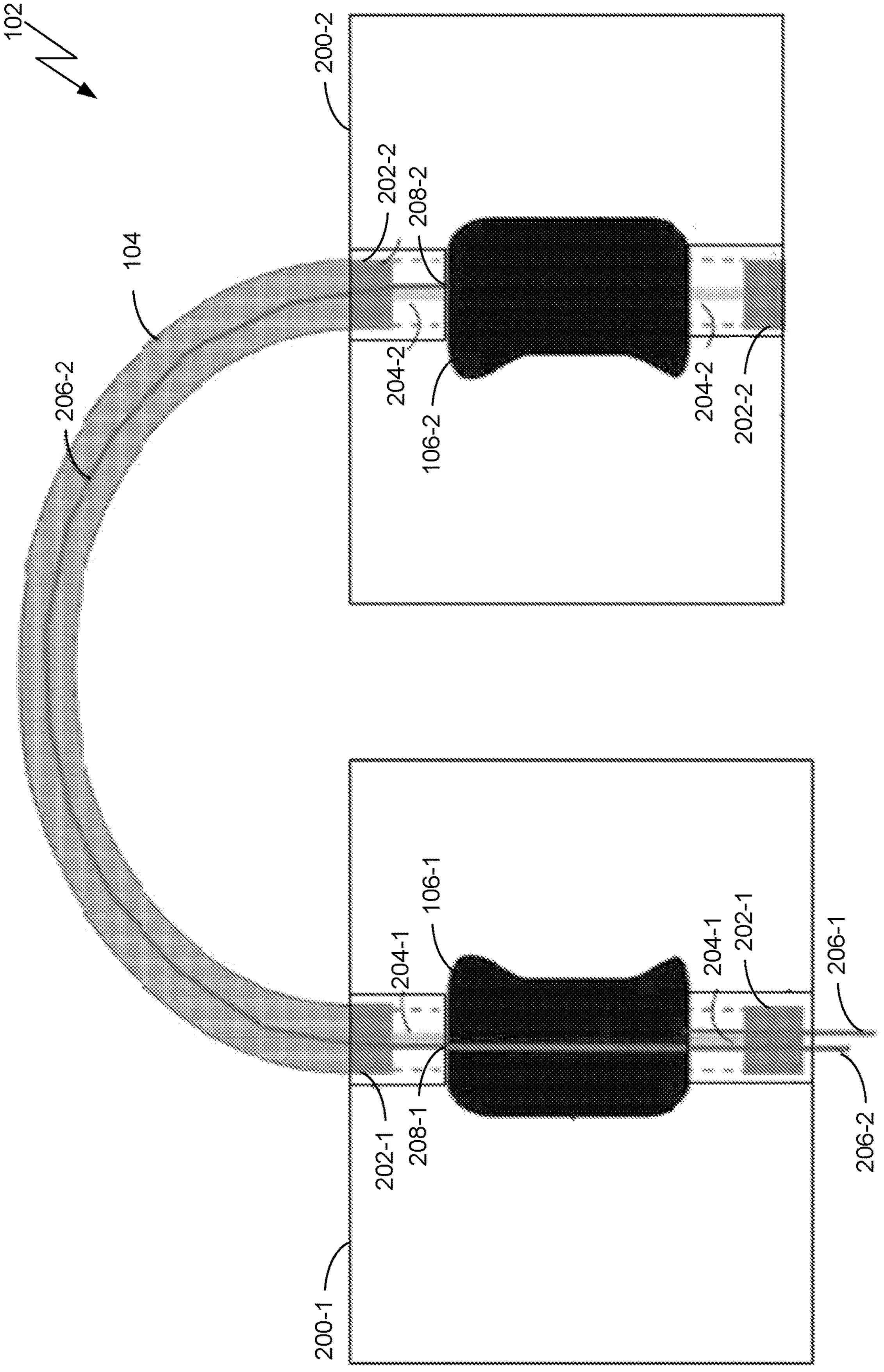
FIG. 2 is a front cut-away view of a headphone assembly configured for use with one or more aspects of the various embodiments.

FIG. 2 is a front cut-away view of a headphone assembly 102 configured for use with one or more aspects of the various embodiments. The headphone assembly includes, without limitation, a headband 104, a left side assembly 200-1, and a right side assembly 200-2. The left side assembly 200-1 includes, without limitation, a left outer ring 202-1, a first elastic sheet 204-1, and a left headphone cup 106-1 coupled to a terminal portion 208-1 of a first signal wire 206-1. The right side assembly 200-2 includes, without limitation, a right outer ring 202-2, a second elastic sheet 204-2, and a right headphone cup 106-2 coupled to a terminal portion 208-2 of a second signal wire 206-2. In some embodiments, each elastic sheet 204 is approximately 5 mm to 10 mm in thickness.

As shown, the left side assembly 200-1 includes a left outer ring 202-1, and the right side assembly 200-2 includes a right outer ring 202-2. While each side assembly of FIG. 2 shows an upper portion of each outer ring 202 (near the headband 104) and a lower portion of each outer ring 202 (near the bottom), it is to be appreciated that the upper portion and the lower portion of each outer ring 202 are adjoined by side portions that are not shown in the front view of FIG. 2. That is, each outer ring 202 is a continuous shape when viewed in a left-to-right direction, only a portion of which is shown in the front cut-away view of FIG. 2. In some embodiments, each outer ring 202 includes a rigid material, such as PVC, polyurethane, or the like. In some embodiments, at least one of the outer rings 202 is integrally formed with the headband 104. In some embodiments, at least one of the outer rings 202 is coupled to the headband 104 by a mechanical fastener, an adhesive, and/or the like. In various embodiments, each outer ring 202 can be any shape, such as a circle, oval, a regular or irregular polygon, or the like.

The left side assembly 200-1 includes a left headphone cup 106-1, and the right side assembly 200-2 includes a right headphone cup 106-2. In some embodiments, each headphone cup 106 includes a rigid material, such as PVC, polyurethane, or the like. In some embodiments, each headphone cup 106 is at least partly enclosed in or at least partly covered by a soft material, soft or spongy material, such as (for example and without limitation) rubber, leather, silicone, or the like, in order to cushion the rigid material from the ear or head of the user. Although not shown, the left headphone cup 106-1 includes a left audio output device 108-1, and the right headphone cup 106-2 includes a right audio output device 108-1.

The left side assembly 200-1 includes a first elastic sheet 204-1 that is coupled to the left outer ring 202-1, and the right side assembly 200-2 includes a second elastic sheet 204-2 that is coupled to the right outer ring 202-2. While each side assembly of FIG. 2 shows an upper portion of each elastic sheet 204 (near the upper portion of each outer ring 202) and a lower portion of each elastic sheet 204 (near the bottom portion of each outer ring 202), it is to be appreciated that the upper portion and the lower portion of each elastic sheet 204 are adjoined by side portions that are not shown in the front view FIG. 2. That is, each elastic sheet 204 is a continuous sheet when viewed in a left-to-right direction, only a portion of which is shown in the front view of FIG. 2. The elastic sheet can be formed of an elastic material, such as (for example and without limitation) rubber, vinyl, leather, silicone, or the like. In various embodiments, each elastic sheet 204 can be any shape, such as a circle, oval, a regular or irregular polygon, or the like.

In some embodiments, each elastic sheet 204 is coupled to the outer ring 202 through at least one clamp, clasp, stitching, adhesive, or the like. In some embodiments, at least one of the elastic sheets 204 is permanently coupled to an outer ring 202. Alternatively or additionally, in some embodiments, at least one of the elastic sheets 204 is detachably coupled to an outer ring 202. In some embodiments, at least one of the elastic sheets 204 is stretched taut across an interior of an outer ring 202. Alternatively or additionally, in some embodiments, at least one of the elastic sheets 204 is loosely adjoined to the outer ring 202. As shown, the elastic sheet 204 is located between the outer ring 202 and the headphone cup 106. However, in some embodiments, a portion of at least one outer ring 202 overlaps, underlaps, and/or extends beyond a portion of an elastic sheet 204. Alternatively or additionally, in some embodiments, a portion of at least one elastic sheet 204 overlaps or encloses a portion of the outer ring 202.

The left headphone cup 106-1 is suspended within the left outer ring 202-1 by the first elastic sheet 204-1, and the right headphone cup 106-2 is suspended within the right outer ring 202-2 by the second elastic sheet 204-2. That is, each headphone cup 106 is spaced apart from the headband 104 and the outer ring 202 to which the elastic sheet 204 is coupled. In some embodiments, each headphone cup 106 is coupled to an elastic sheet 204 by at least one clamp, clasp, stitching, adhesive, or the like.

In operation, when a user wears the headphone assembly, the ears or head of the user push each headphone cup 106 outward (that is, along a left/right axis) and/or along one or more axes (such as a forward/backward axis and/or an up/down axis). The pressure is caused by the size, shape, and orientation of the ears and head of the user. Pressure on the headphone cups 106 causes the elastic sheet 204 to flex or stretch outward (that is, along a left/right axis), and/or to rotate along one or more axes (such as a forward/backward axis and/or an up/down axis). The elasticity of the elastic sheet 204 creates an inward pressure of the headphone cups 106 against the ears or head of the user. Further, the elasticity of the elastic sheet 204 enables the position and orientation of the headphone cups 106 to conform to the position and orientation of the ears and head of the user. As a result, a seal is created between the headphone cups 106 and the ears of the user. The seal reduces leakage of audio from within the headphone cup 106 and improves isolation of the audio from ambient noise. In embodiments that include active noise cancellation, the seal reduces leakage of the anti-noise and improves the efficiency of noise cancellation. Further, the elasticity of the elastic sheet 204 enables the position and/or orientation of the headphone cups 106 to adapt to the size, shape, location, and orientation of the ears or head of the user, thus improving the seal for a wide range of users.

As another advantage, the flexibility of the elastic sheet improves the positioning of the headphone cup relative to the pinna of the ear with reduced inward pressure against the pinna or the head as compared with pivot mechanisms, resulting in improved comfort and wearability. As yet another advantage, the substitution of elastic sheet for pivot mechanisms improves the durability of the headphones by reducing potential points of mechanical failure. As yet another advantage, the use of elastic sheets reduces the volume of rigid material in the headphone cups, resulting in desirably smaller and lighter headphones. These technical advantages provide one or more technological improvements over prior art headphones.

In some embodiments, each headphone cup 106 is located at a center of each elastic sheet 204. Locating a headphone cup 106 in a center of an elastic sheet 204 can maximize the elasticity of the elastic sheet, and therefore the conformity of each headphone cup 106 to each ear of the user. In some embodiments, the elastic sheet 204 isolates the headphone cup 106 from contact with the outer ring 202. Due to the isolation, the elastic sheet 204 enables the headphone cup 106 to change position and/or orientation freely within the space of the outer ring 202 as the elastic sheet 204 flexes. That is, the elastic sheet 204 is stretchable in a direction that is nonparallel with an inner or outer surface of the elastic sheet 204 (e.g., stretchable an outward direction with respect to the head of a user 116 wearing the headphone assembly 102), which enables the headphone cup 106 to move outward to accommodate the width of the head of the user 116.

The headphone assembly includes a first signal wire 206-1 and a second signal wire 206-2. The first signal wire 206-1 includes a first terminal portion 208-1 that is coupled to the left audio output device 108-1. The second signal wire 206-2 includes a second terminal portion 208-2 that is coupled to the right headphone cup 106-2. The left and right signal wires 206 carry an audio signal 112 transmitted by an audio source 110 to the left and right audio output devices 108, respectively. As shown, the first signal wire 206-1 (and specifically the first terminal portion 208-1) is directly coupled to the left headphone cup 106-1, while the second signal wire 206-2 is routed along or through the headband 104 in order to be coupled (specifically by second terminal portion 208-2) directly to the right headphone cup 106-2. In this configuration, the first signal wire 206-1 and the second signal wire 206-2 can be coupled to the headphone assembly on one side (e.g., the left side), and/or included in one cable, and can be routed to the respective headphone cups 106 by being integrated with the other components of the headphone assembly. In some other embodiments (not shown), the second signal wire 206-2 is directly coupled to the right headphone cup 106-2 without being routed through the headband 104, such as through two signal wires 206 in separate cables.

In some embodiments, at least a portion of at least one signal wire 206 is integrated with the elastic sheet 204. That is, at least a portion of at least one signal wire 206 can be affixed to the inner or outer surface of an elastic sheet 204, and/or embedded within an elastic sheet 204. In some embodiments, at least one elastic sheet 204 covers and hides at least a portion of at least one signal wire 206.

It will be appreciated that the system shown herein is illustrative and that variations and modifications are possible. The connection topology, including the location and arrangement of the headband 104, the side assemblies 200, the headphone cups 106, the elastic sheets 204, the outer rings 202, and the signal wires 206 can be modified as desired. In some embodiments, one or more components shown in FIG. 2 might not be present. In some embodiments, some components shown in FIG. 2 might be duplicated or altered. In some embodiments, additional components that are not shown in FIG. 2 might be included.

Note that the techniques described herein are illustrative rather than restrictive and may be altered without departing from the broader spirit and scope of the embodiments. Many modifications and variations will be apparent to those of ordinary skill in the art without departing from the scope and spirit of the described embodiments and techniques. Further, in various embodiments, any number of the techniques disclosed herein may be implemented while other techniques may be omitted in any technically feasible fashion.

Figure 3:
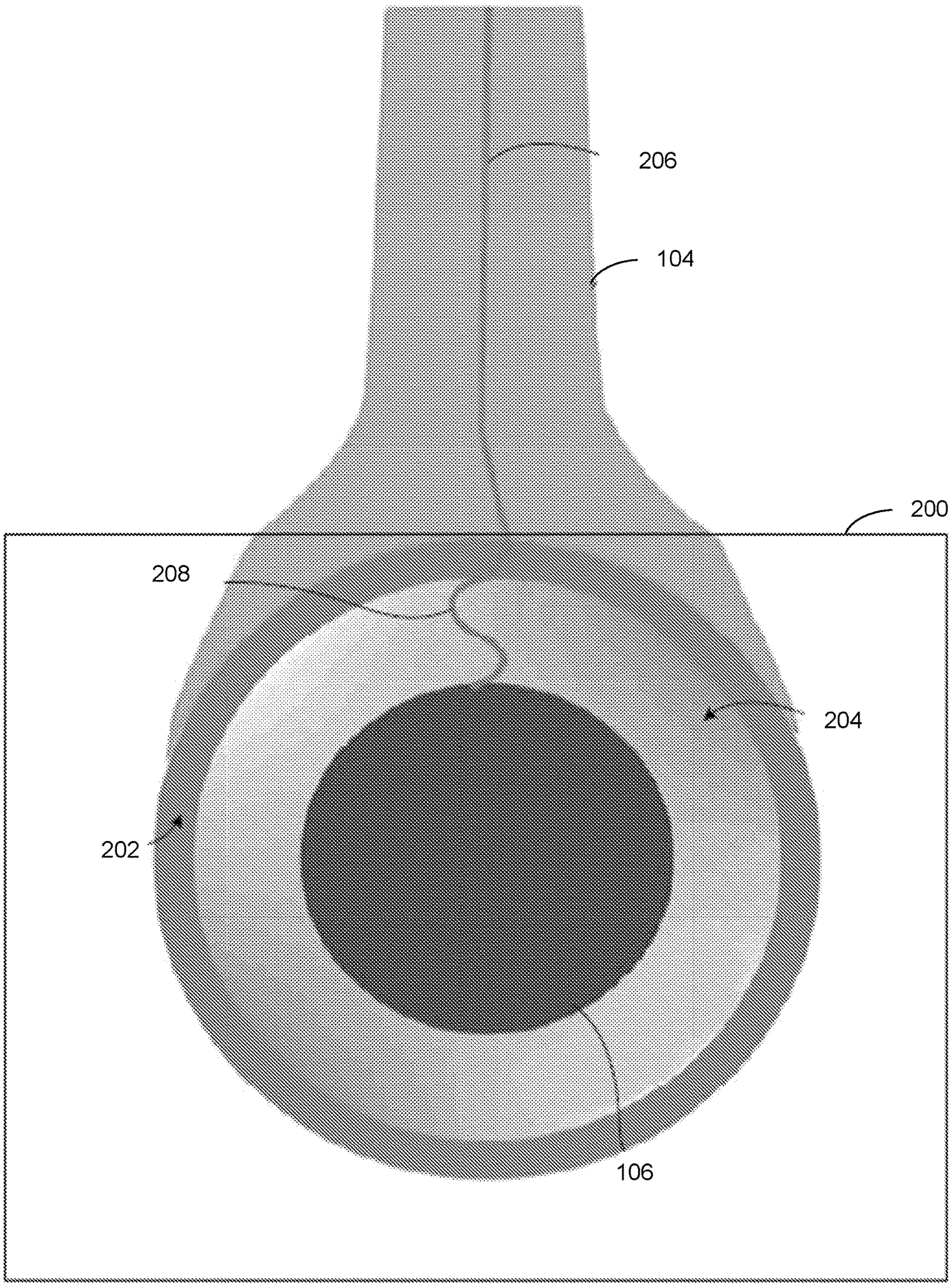
FIG. 3 is a more detailed illustration of a side assembly of the headphone assembly of FIGS. 1A, 1B, and 2, according to various embodiments.
Figure 4A:
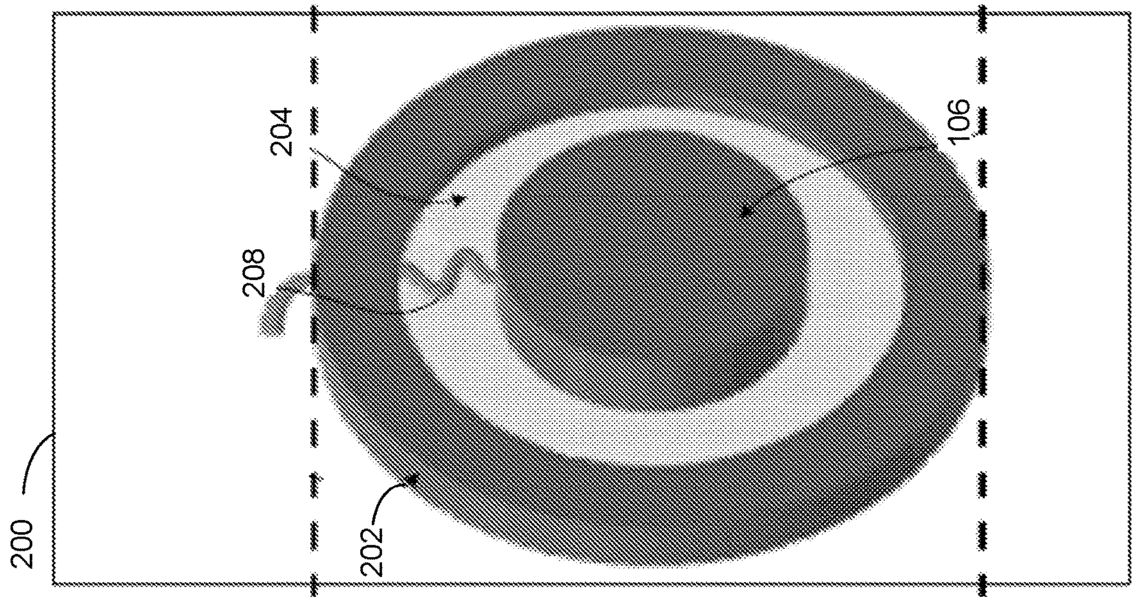
FIGS. 4A-4D are perspective views of the side assembly of FIGS. 2 and 3, according to various embodiments.
Figure 4B:
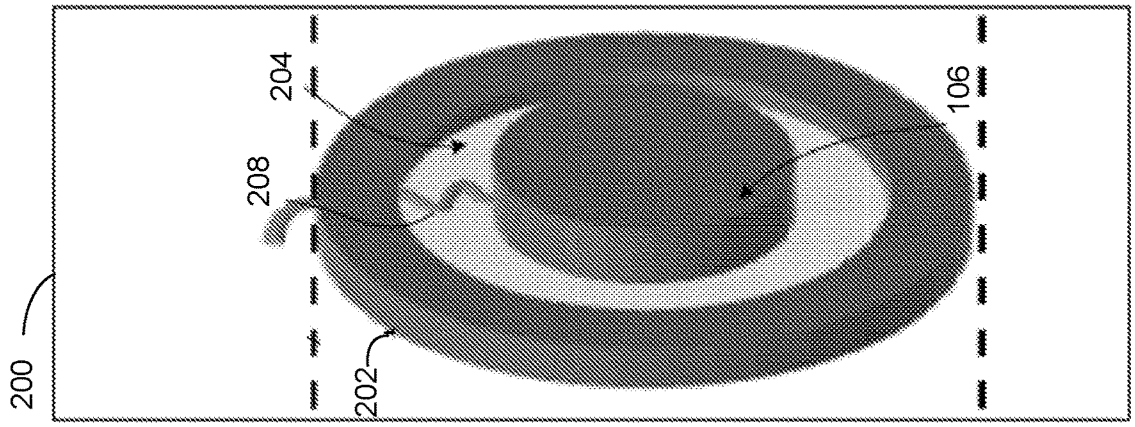
Figure 4C:
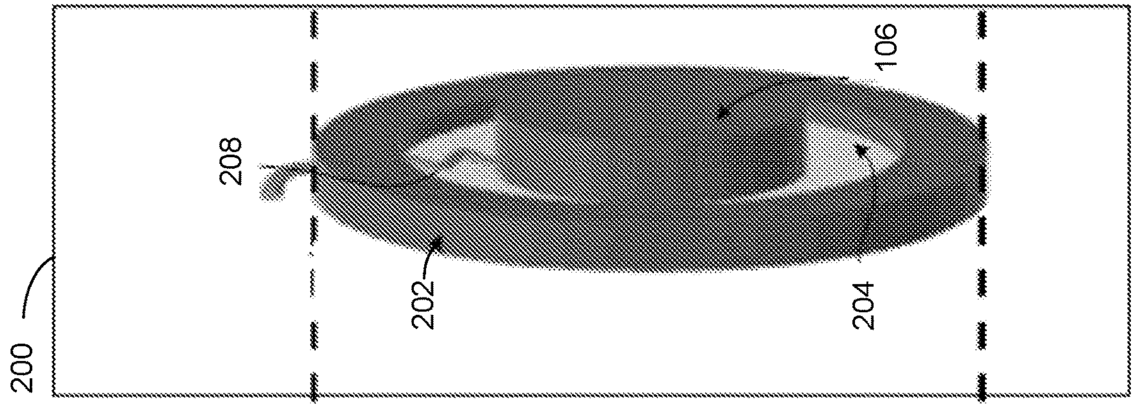
Figure 4D:
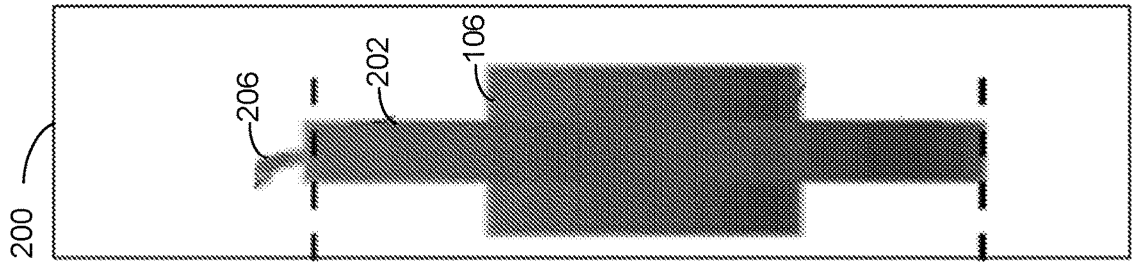

FIG. 3 is a partial side-view of a side assembly 200 of the headphone assembly 102 of FIGS. 1A, 1B, and 2, according to various embodiments. The side assembly 200 of FIG. 3 includes, without limitation, an outer ring 202, an elastic sheet 204, and a headphone cup 106.

As shown, the headphone assembly includes a signal wire 206 that terminates in a terminal portion 208 that is coupled to the headphone cup 106 (and, in particular, to an audio output device within the headphone cup 106 that is not shown in FIG. 3). A portion of the signal wire 206 is routed through the headband 104. The portion of the signal wire 206 can be affixed to a surface of the headband 104, or can be integral with (e.g., embedded within) the headband 104. In some embodiments, at least a portion of at least one signal wire 206 is flexible. That is, at least a portion of at least one signal wire 206 can be made of a flexible material and can flex as the elastic sheet 204 flexes. In some embodiments, at least one of the signal wires 206 is stretchable. That is, at least a portion of at least one signal wire 206 can be made of a stretchable material and can stretch as the elastic sheet 204 stretches. As shown, the terminal portion 208 includes at least one switchback, that is, at least one S-shaped lateral curve. Switchbacks in the terminal portion 208 of the signal wire 206 can improve the flexibility and/or stretchability of the terminal portion 208. Flexibility and/or durability of the signal wire 206 can reduce the likelihood of separation of the signal wire 206 from the audio output device while the headphone assembly is under mechanical strain.

As shown, each of the outer ring 202, the elastic sheet 204, and the headphone cup 106 has a circular shape. However, in various embodiments, each of the outer ring 202, the elastic sheet 204, and the headphone cup 106 can be any shape, such as a circle, oval, a regular or irregular polygon, or the like.

As shown, the elastic sheet 204 is located within the outer ring 202 in side view, and the headphone cup 106 is located within (and, specifically, at a center of) the elastic sheet 204. However, in various embodiments, at least a portion of each of the outer ring 202, the elastic sheet 204, and the headphone cup 106 can underlap, overlap, and/or extend beyond at least a portion of one or both of the other elements. For example and without limitation, at least a portion of the elastic sheet 204 can enclose at least a portion of the outer ring 202. In some embodiments, at least a portion of an outer edge of the elastic sheet 204 is enclosed by the outer ring 202. In some embodiments, at least a portion of an outer edge of the elastic sheet 204 encloses at least a portion of the outer ring 202.

FIGS. 4A-4D are perspective views of the side assembly 200 of FIGS. 2 and 3, according to various embodiments. The side assembly 200 of each of FIGS. 4A-4D includes, without limitation, an outer ring 202, an elastic sheet 204, and a headphone cup 106.

As shown in each of FIGS. 4A-4D, the headphone cup 106 is suspended within the outer ring 202 by the elastic sheet 204. As further shown in each of FIGS. 4A-4C, a terminal portion 208 of a signal wire 206 is coupled to a headphone cup 106 (and, in particular, to an audio output device within the headphone cup 106). The terminal portion 208 of the signal wire 206 includes at least one switchback, that is, at least one S-shaped lateral curve. Switchbacks in the terminal portion 208 of the signal wire 206 can improve the flexibility and/or stretchability of the terminal portion 208. Flexibility and/or durability of the signal wire 206 can reduce the likelihood of separation of the signal wire 206 from the audio output device while the headphone assembly is under mechanical strain.

In sum, the disclosed headphone assembly includes a headband that is coupled to an outer ring. An elastic sheet, such as a sheet of latex or vinyl, is coupled to the outer ring. A headphone cup is suspended within the outer ring by the elastic sheet. The headphone assembly establishes a position of the headphone cup on or around the ear of the user. The flexibility of the elastic sheet enables the position of the headphone cup to adapt to the shape of the head and/or pinna of the user and to create an improved seal between the headphone cup and the ear of the user.

At least one technical advantage of the disclosed techniques relative to the prior art is that, with the disclosed techniques, an improved seal is created between the headphone cup and the ear of the user. As a result, generated audio is less susceptible to leakage and more insulated from ambient noise, thus improving perceived audio quality. As another advantage, the flexibility of the elastic sheet improves the positioning of the headphone cup relative to the pinna of the ear with reduced inward pressure against the pinna as compared with pivot mechanisms, resulting in improved comfort and wearability. As yet another advantage, the substitution of elastic sheet for pivot mechanisms improves the durability of the headphones by reducing potential points of mechanical failure. As yet another advantage, the use of elastic sheets reduces the volume of rigid material in the headphone cups, resulting in desirably smaller and lighter headphones. These technical advantages provide one or more technological improvements over prior art headphones.

1. In some embodiments, a headphone assembly comprises a headband that is coupled to an outer ring; an elastic sheet that is coupled to the outer ring; and a headphone cup that is suspended within the outer ring by the elastic sheet.

2. The headphone assembly of clause 1, wherein the elastic sheet is configured to press the headphone cup against at least one of a portion of a head of a user or a pinna of an ear of the user.

3. The headphone assembly of clauses 1 or 2, wherein the headphone cup is located at a center of the elastic sheet.

4. The headphone assembly of any of clauses 1-3, wherein the elastic sheet isolates the headphone cup from contact with the outer ring.

5. The headphone assembly of any of clauses 1-4, wherein the elastic sheet is stretchable in a direction that is nonparallel with a surface of the elastic sheet.

6. The headphone assembly of any of clauses 1-5, further comprising an audio output device and a signal wire configured to couple the audio output device to an audio source.

7. The headphone assembly of clause 6, wherein at least a portion of the signal wire is integrated with the elastic sheet.

8. The headphone assembly of clause 7, wherein at least a portion of the portion of the signal wire integrated with the elastic sheet is stretchable.

9. The headphone assembly of any of clauses 6-8, wherein the signal wire includes a terminal portion that is coupled to the audio output device, the terminal portion including at least one switchback.

10. The headphone assembly of any of clauses 6-9, wherein at least a portion of the signal wire is integrated with the headband.

11. The headphone assembly of any of clauses 6-10, further comprising another audio output device and another wire configured to couple the another audio output device to the audio source.

12. In some embodiments, an audio system comprises an audio source; an audio output device configured to generate output based on an audio signal received from the audio source; and a headphone assembly including, a headband that is coupled to an outer ring, an elastic sheet that is coupled to the outer ring, and a headphone cup that is suspended within the outer ring by the elastic sheet.

13. The audio system of clause 12, wherein the elastic sheet is configured to press the headphone cup against at least one of a portion of a head of a user or a pinna of an ear of the user.

14. The audio system of clauses 12 or 13, wherein the headphone cup is located at a center of the elastic sheet.

15. The audio system of any of clauses 12-14, wherein the elastic sheet isolates the headphone cup from contact with the outer ring.

16. The headphone assembly of any of clauses 12-15, wherein the elastic sheet is stretchable in a direction that is nonparallel with a surface of the elastic sheet.

17. The audio system of any of clauses 12-16, further comprising a signal wire configured to couple the audio output device to the audio source.

18. The audio system of clause 17, wherein at least a portion of the signal wire is integrated with the elastic sheet.

19. The audio system of clauses 17 or 18, wherein at least a portion of the signal wire is integrated with the headband.

20. The audio system of any of clauses 17-19, further comprising another audio output device, and another signal wire configured to couple the another audio output device to the audio source.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

While the preceding is directed to embodiments of the present disclosure, other and further embodiments of the disclosure can be devised without departing from the basic scope thereof, and the scope thereof is determined by the claims that follow.

What is claimed is:

1. A headphone assembly, comprising:
- a headband that is coupled to an outer ring;
- an elastic sheet that is coupled to the outer ring, wherein the elastic sheet includes:
  - an inner surface that extends to the outer ring, and
  - an outer surface parallel to the inner surface that extends to the outer ring;
- a headphone cup that is suspended within the outer ring by the elastic sheet; and
- a signal wire configured to couple an audio output device to an audio source,
  wherein:
  - at least a portion of the signal wire is embedded within the inner surface and the outer surface of the elastic sheet, and
  - the signal wire extends from the headphone cup to the outer ring.

2. The headphone assembly of claim 1, wherein the elastic sheet is configured to press the headphone cup against at least one of a portion of a head of a user or a pinna of an ear of the user.

3. The headphone assembly of claim 1, wherein the headphone cup is located at a center of the elastic sheet.

4. The headphone assembly of claim 1, wherein the elastic sheet isolates the headphone cup from contact with the outer ring.

5. The headphone assembly of claim 1, wherein the elastic sheet is stretchable in a direction that is nonparallel with a surface of the elastic sheet.

6. The headphone assembly of claim 1, further comprising the audio output device.

7. The headphone assembly of claim 6, wherein the signal wire includes a terminal portion that is coupled to the audio output device, the terminal portion including at least one switchback.

8. The headphone assembly of claim 6, wherein at least a second portion of the signal wire is integrated with the headband.

9. The headphone assembly of claim 6, further comprising another audio output device and another wire configured to couple the another audio output device to the audio source.

10. The headphone assembly of claim 1, wherein at least a portion of the portion of the signal wire that is embedded in the elastic sheet is stretchable.

11. An audio system, comprising:
- an audio source;
- an audio output device configured to generate output based on an audio signal received from the audio source; and
- a headphone assembly including,
  - a headband that is coupled to an outer ring,
  - an elastic sheet that is coupled to the outer ring, wherein the elastic sheet includes:
    - an inner surface that extends to the outer ring, and
    - an outer surface parallel to the inner surface that extends to the outer ring,
  - a headphone cup that is suspended within the outer ring by the elastic sheet; and
  - a signal wire configured to couple the audio output device to the audio source, wherein:
    - at least a portion of the signal wire is embedded within the inner surface and the outer surface of the elastic sheet, and
    - the signal wire extends from the headphone cup to the outer ring.

12. The audio system of claim 11, wherein the elastic sheet is configured to press the headphone cup against at least one of a portion of a head of a user or a pinna of an ear of the user.

13. The audio system of claim 11, wherein the headphone cup is located at a center of the elastic sheet.

14. The audio system of claim 11, wherein the elastic sheet isolates the headphone cup from contact with the outer ring.

15. The audio system of claim 11, wherein the elastic sheet is stretchable in a direction that is nonparallel with a surface of the elastic sheet.

16. The audio system of claim 11, wherein at least a second portion of the signal wire is integrated with the headband.

17. The audio system of claim 11, further comprising another audio output device, and another signal wire configured to couple the another audio output device to the audio source.

* * * * *